United States Patent [19]  [11] 4,105,802
Cho et al.  [45] Aug. 8, 1978

[54] PROCESS FOR PRODUCING CARBONATED COFFEE DRINK

[75] Inventors: Kichinosuke Cho, Funabashi; Tsutomu Watanabe, Tokyo, both of Japan

[73] Assignee: Kabushiki Kaisha Art Coffee, Tokyo, Japan

[21] Appl. No.: 759,489

[22] Filed: Jan. 14, 1977

Related U.S. Application Data

[63] Continuation of Ser. No. 661,115, Feb. 25, 1976, abandoned, which is a continuation of Ser. No. 506,689, Sep. 17, 1974, abandoned.

[30] Foreign Application Priority Data

Sep. 20, 1973 [JP] Japan .............................. 48-126086

[51] Int. Cl.² .............................................. A23F 1/00
[52] U.S. Cl. .................................. 426/329; 426/477; 426/594
[58] Field of Search ........................ 426/329, 477, 594

[56] References Cited

U.S. PATENT DOCUMENTS

| 2,118,184 | 5/1938 | Fronmuller et al. ................. 426/594 |
| 2,620,276 | 12/1952 | Heyman ............................ 426/594 X |
| 3,142,572 | 7/1964 | Miller et al. ...................... 426/329 |
| 3,595,669 | 7/1971 | Strobel ............................. 426/594 X |
| 3,879,565 | 4/1975 | Einstman ......................... 426/329 X |
| 3,925,242 | 12/1975 | Sagi et al. ......................... 426/329 X |

*Primary Examiner*—Raymond N. Jones
*Assistant Examiner*—Robert J. Warden

[57] ABSTRACT

A process for producing carbonated coffee drink, wherein one or more kinds of organic additives are added to extracted coffee liquid, followed by carbonation of the same, to suppress the bubbling or foaming of the thus prepared carbonated coffee drink, while maintaining its body, taste, and flavor which are essentially that of freshly brewed coffee.

8 Claims, No Drawings

PROCESS FOR PRODUCING CARBONATED COFFEE DRINK

This is a continuation, of application Ser. No. 661,115 filed Feb. 25, 1976, now abandoned, which is a continuation of application Ser. No. 506,689 filed Sept. 17, 1974 now abandoned.

BACKGROUND OF THE INVENTION

This invention relates to a process for producing carbonated coffee drink, in which the bubbling from such coffee drink is suppressed, while maintaining body, taste, and flavor which are essentially that of freshly brewed coffee.

The carbonated coffee drink is generally produced by mixing coffee extract with carbonated water, or by impregnating the coffee extract with carbon dioxide to carbonate the same. The thus produced carbonated coffee drink is generally charged into various types of container for transportation and sale.

As has already been acknowledged by all connoisseurs, the quality of coffee is determined by the body, taste, and flavor which it has. All of these qualities are so important in the brewed coffee that they are deservedly called "the soul of coffee." The body, taste, and flavor are created by various constituents in the coffee. Of these constituents, colloidal material is one of the most important constituents in the coffee. That is, this colloidal material constituents an important element for imparting the body, taste, flavor to the coffee, from which the smoothness of coffee is also derived. At the same time, however, this substance accelerates bubbling of the coffee, although its absence deprives the coffee drink of its body, taste, and smoothness.

It will be appreciated that the aforementioned coffee extract contains a large amount of the colloidal material, and hence the aforedescribed carbonated coffee drink produced by using such coffee extract naturally contains a large amount of such colloidal material. On account of this, the coffee drink bubbles intensely at the time that it is charged into a container, or upon opening of cans or pulling of caps off bottle containers, or upon pouring the drink from the container into receptacles therefore, thus causing a large quantity overflow of the drink from such container or receptacle. As the result of this, it becomes necessary to suppress the bubbling from this carbonated coffee drink to the greatest possible extent. With a view to suppressing such undesirable bubbling, various processes have heretofore been practiced, wherein an attempt has been made as to removed or degrade the colloidal material which is the principal cause for such bubbling.

The following processes, for example, are well known: (1) a process, in which the colloidal material is physically removed from the coffee extract by filtration or separation using, for example, asbestos, diatomaceous earth, or microfilters; and (2) a process, in which the colloidal material is enzymatically degraded by admixing various kinds of enzymes such as protease, tannase, amylase, etc., into the coffee extract.

However, according to these known processes, the body, taste, and flavor inherent in the freshly brewed coffee are seriously impaired in such processed coffee drink, although the suppression of undesirable bubbling has been accomplished, since each of these known processes comprises removing or degrading the colloidal material. Accordingly, the thus obtained coffee drink tastes bland.

It has been said that retention of flavor of the extracted coffee extract (or liquid coffee) at a normal temperature is one of the most difficult problems in the production of coffee drinks, and has even been considered impossible.

Generally speaking, change in the flavor of liquid coffee is mostly ascribable to oxidation due to oxygen in the air. In order to prevent or decrease such undesirable oxidation, there have been practiced various expedients, among which are: (1) vacuum packing of the coffee extract; (2) deaeration of the liquid coffee to remove oxygen dissolved in the liquid; (3) substitution of an inert gas; for oxygen and so forth.

Of the abovementioned representative methods, when the third method is employed to carbonate the extracted coffee with carbon dioxide gas as the inert gas, it is recognized that, with increase in the volume of carbon dioxide gas, the change in the coffee flavor becomes reduced, and its preservation is heightened. At the same time, this increase in the gas volume is also recognized as contributing to sterilization of the coffee extract. In view of the fact that coffee extract has a high pH value, an additional sterilization process is particularly required to preserve it in a liquid form. For this purpose, there has been adopted the ordinary high temperature sterilization process, although it is not desirable from the standpoint of the flavor retention.

Especially, according to the latter process, the obtained coffee drink is liable to give out an unpleasant odor attributable to the odor of enzymes or produced by the enzymatic degradation. Hence, it cannot be said that the enzymatic process is preferable. Furthermore, each of the processes comprises complicated process steps, and necessitates complicated installations.

SUMMARY OF THE INVENTION

Accordingly, it is an object of this invention to provide a process for producing a carbonated coffee drink in which the bubbling of the coffee drink is suppressed without losing body, taste, and flavor which are essentially those of freshly brewed coffee.

Another object of this invention is to provide a process for producing carbonated coffee drink, in which the bubbling of the coffee drink is reduced to a minimum without removing or degrading the colloidal material present in the coffee extract.

Still another object of this invention is to provide a process for producing carbonated coffee drink with a simplified installation for the production.

The foregoing objects and further objects of this invention can be accomplished by providing a process for producing carbonated coffee drink, which is carried out by preparing coffee extract from roasted and ground coffee beans; preparing coffee syrup by addition of sugar solution of predetermined to the coffee extract; adding to said coffee syrup one or more kinds of additives, in a predetermined quantity, selected from the group consisting of glycerin fatty acid esters, sorbitan fatty acid esters, propylene glycol fatty acid esters, and silicone resin; carbonating said syrup of coffee extract; and packaging the carbonated coffee extract in a container.

The nature, principle, and details of this invention will become more apparent from the following detailed description.

DETAILED DESCRIPTION OF THE INVENTION

First of all, coffee beans are roasted and ground, and the thus ground coffee is extracted with hot water to obtain coffee extract. This extraction is normally carried out by using 650 to 700 liters of hot water with respect to 100 kg of the ground coffee. Then, impurities and precipitates in the obtained coffee extract are separated and removed therefrom by using a filter or a centrigual separator, etc..

This coffee extract may be, if necessary, mixed with, for example, sugar solution to prepare coffee syrup.

Then, there is added, with stirring, to the thus obtained coffee extract, glycerin fatty acid ester, sorbitan fatty acid ester, propylene glycol fatty acid ester, or silicone resin, singly or in combination. The amount of these additives may be varied over a wide range. Usually, ranges of 20 mg to 5 g of the fatty acid ester, and 10 mg to 2.5 g. of the silicone resin with respect to 1 kg of the solid contents in the coffee extract are particularly preferred.

The abovementioned glycerin fatty acid ester may be glycerin mono-oleate; the abovementioned sorbitan fatty acid ester may be, for example, sorbitan mono-laurate, sorbitan mono-stearate, sorbitan mono-oleate, sorbitan tri-stearate, sorbitan tri-oleate or sorbitan sesquioleate; the propylene glycol fatty acid ester may be propylene glycol mono-oleate; and the silicone resin may be, for example, emulsified silicone resin.

While these additives may be directly added to the coffee extract, the fatty acid esters may be preferably dissolved in an edible organic solvent such as propylene glycol, ethyl alcohol, etc., or dispersed in water or other dispersion medium, and the silicon resin may also be preferably dispersed in water or other dispersion medium to be added in this form to the coffee extract.

The thus obtained coffee extract is then carbonated by the well known processes. For example, it is carbonated by mixing with carbonated water, or by being impregnated with carbon dioxide ($CO_2$) gas under pressure, thereby producing carbonated coffee drink.

The carbonated coffee drink is then charged into a container such as a can or bottle by the conventional method so as to be suitable for individual consumption.

The carbonated coffee drink in the can or bottle develops scarcely any bubbles and seldom gives rise to overflow at the time of opening the container, and pouring the contents into receptacles. Further, it maintains the excellent body, taste, and flavor of freshly brewed coffee with only the slightest change.

Thus, according to the present invention, by addition of the afore-mentioned additives to the extracted coffee liquid, not only the qualities of the freshly brewed coffee, i.e., body, taste, and flavor, can be retained, but also the undesirable characteristics of the carbonated coffee drink are completely suppressed or controlled, and the production of the carbonated coffee drink on an industrialized scale becomes feasible, since its production is free from the aforementioned major obstacles, without the solution of which the production of carbonated coffee drink is very difficult or even impossible. Furthermore, the method of this invention does not necessitate any complicated installations for removing or degrading the colloidal material as in the conventional method, since it does not carry out the removing or degrading of the colloidal material. Hence it can be said that the present method is one in which the installation for producing the carbonated coffee drink is simplified.

In order to enable those skilled in the art to reduce the present invention to practice, the following preferred examples are presented. It should, however, be noted that these examples are merely illustrative, and that changes and modifications in the ingredients to be used may be made within the spirit and scope of the present invention as recited in the appended claims.

PREFERRED EMBODIMENTS

EXAMPLE 1

Coffee beans were roasted and ground. Then, using 650 liters of hot water with respect to 100 kg of ground coffee, coffee extract was made. Thereafter, the extract was subjected to centrifugal separation to remove impurities and precipitates existing therein, as the result of which 500 liters of coffee extract was obtained.

On the other hand, 100 kg of sugar was heated with water and dissolved to form sugar syrup. After cooling the syrup, the coffee extract was added thereto to prepare coffee syrup.

To the coffee syrup thus obtained, a solution prepared by dissolving 40 g of glycerin mono-oleate to 2 liters of propylene glycol was added with stirring.

Subsequently, the coffee syrup was diluted with water to an amount of 1,000 liters, and this diluted coffee liquid was carbonated by impregnating the same with carbon dioxide ($CO_2$) gas under pressure to obtain the desired carbonated coffee drink.

The thus obtained carbonated coffee drink was charged into a can to obtain a canned carbonated coffee drink. It was found that, when this canned carbonated beverage was opened, the degree of bubbling from this carbonated coffee drink was extremely low, and no overflowing of the drink at all took place. Thereafter, the drink in the can was poured into a glass tumbler with scarcely any bubbling. The drink in the tumbler was then tasted, and the excellent body, taste and flavor of freshly brewed coffee was found to remain.

EXAMPLE 2

The coffee syrup was produced in the same manner as in Example 1 above.

20 g of emulsified silicone resin (in terms of weight of the resin) was dispersed into 100 ml of water, then the aqueous dispersion of this silicone resin was added to the aforementioned coffee syrup with stirring. Thereafter, the coffee syrup was carbonated in the same manner as in Example 1 to obtain carbonated coffee drink, followed by packaging the same in can to obtain a canned carbonated coffee drink. The can was then opened to taste the coffee drink. The results were exactly same as in Example 1.

EXAMPLE 3

The coffee syrup was produced in the same manner as in Example 1.

40 g of glycerin mono-oleate was mechanically dispersed in 100 ml of water, and then the aqueous dispersion of this substance was added to the afore-mentioned coffee syrup with stirring.

The coffee syrup was then carbonated in the same manner as in Example 1 to obtain carbonated coffee drink, followed by packaging the same in a bottle to obtain a bottled carbonated coffee drink. The cap of the bottle was then removed to taste the coffee drink. The results were exactly same as in Example 1.

EXAMPLE 4

The coffee syrup was produced in the same manner as in Example 1.

10 g of emulsified silicone resin (in terms of weight of the resin) was dispersed into 50 ml of water, and separately, 20 g of glycerin mono-oleate was dissolved into 1 liter of propylene glycol; thereafter, the aqueous dispersion and solution were added in sequence to the afore-mentioned coffee syrup with stirring.

The coffee syrup was then carbonated in the same manner as in Example 1 to obtain carbonated coffee drink. The thus obtained coffee drink was then charged into a can to obtain a canned carbonated coffee drink. The can was opened to taste the coffee drink. The results were exactly the same as in Example 1.

EXAMPLE 5

10 g of emulsified silicone resin (in terms of weight of the resin) was dispersed into 50 ml of water. Separately, 25 g of sorbitan mono-laurate was dispersed by mechanical means into 100 ml of water. These aqueous dispersions were added in sequence with stirring to the coffee syrup prepared in the same manner as in Example 1.

The coffee syrup was then carbonated in the same manner as in Example 1 to obtain carbonated coffee drink. Thereafter, the thus obtained coffee drink was charged into a can to obtain a canned carbonated coffee drink. The can was then opened to taste the coffee drink. The results were exactly the same as in Example 1.

EXAMPLE 6

40 g of propylene glycol mono-oleate was dissolved into 2 liters of ethyl alcohol, and the thus obtained alcohol solution was added, with stirring, to the coffee syrup obtained in the same manner as in Example 1.

After that, the coffee syrup was carbonated in the same manner as in Example 1 to obtain carbonated coffee drink, and then, the thus obtained coffee drink was charged into a can to obtain a canned carbonated coffee drink. The can was then opened to taste the coffee drink. The results were exactly the same as in Example 1.

What is claimed is:

1. A process for preserving the natural body, taste and flavor of packaged freshly brewed coffee liquid without removing or degrading the colloidal material present therein which comprises preparing an aqueous coffee extract from roasted and ground coffee beans, adding to and dispersing in said coffee extract an effective amount of a propylene glycol fatty acid ester as an anti-foaming agent or a mixture of said propylene glycol fatty acid ester and a second anti-foaming agent selected from the group consisting of glycerin fatty acid esters, sorbitan fatty acid esters, and silicone resin; carbonating said coffee extract by impregnating the same with carbon dioxide under pressure and packaging said carbonated coffee extract in a sealed container; said amount being effective to reduce the foaming when said container is opened.

2. A process according to claim 1 wherein said second anti-foaming agent is glycerine mono-oleate.

3. A process according to claim 1 wherein said second anti-foaming agent is selected from the group consisting of sorbitan mono-laurate, sorbitan mono-stearate, sorbitan mono-oleate, sorbitan tri-stearate, sorbitan tri-oleate and sorbitan sesquioleate.

4. A process according to claim 1 wherein said second anti-foaming agent is sorbitan mono-laurate.

5. A process according to claim 1 wherein said second anti-foaming agent is propylene glycol mono-oleate.

6. A process according to claim 1 wherein said second anti-foaming agent is emulsified silicone resin.

7. A process according to claim 1 wherein the amount of said anti-foaming agent or mixture of agents per kilogram of solids in the coffee extract is 20 milligrams to 5 grams.

8. A packaged coffee beverage made by the process of claim 1.

* * * * *